(12) United States Patent
Mouri et al.

(10) Patent No.: US 9,939,015 B2
(45) Date of Patent: Apr. 10, 2018

(54) SINTERED BEARING

(71) Applicants: Toshihiko Mouri, Aichi (JP);
Noriyoshi Yoshizuka, Aichi (JP);
Yousuke Sugai, Aichi (JP); Fuminori Satoji, Aichi (JP)

(72) Inventors: Toshihiko Mouri, Aichi (JP);
Noriyoshi Yoshizuka, Aichi (JP);
Yousuke Sugai, Aichi (JP); Fuminori Satoji, Aichi (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/236,913

(22) Filed: Aug. 15, 2016

(65) Prior Publication Data
US 2016/0348722 A1 Dec. 1, 2016

Related U.S. Application Data

(63) Continuation of application No. 14/976,437, filed on Dec. 21, 2015, now Pat. No. 9,441,670, which is a
(Continued)

(30) Foreign Application Priority Data

Mar. 7, 2012 (JP) .................................. 2012-050896
Mar. 7, 2013 (JP) .................................. 2013-045117

(51) Int. Cl.
*F16C 33/02* (2006.01)
*F16C 33/12* (2006.01)
(Continued)

(52) U.S. Cl.
CPC ............. *F16C 33/125* (2013.01); *B22F 3/16* (2013.01); *B22F 5/106* (2013.01); *B22F 7/02* (2013.01);
(Continued)

(58) Field of Classification Search
CPC ...... F16C 17/02; F16C 33/104; F16C 33/128; F16C 33/145; B22F 5/106; B22F 7/02;
(Continued)

(56) References Cited

U.S. PATENT DOCUMENTS 2,364,713 A 12/1944 Hensel
4,878,768 A 11/1989 Fukuoka
(Continued)

FOREIGN PATENT DOCUMENTS

CN 1434225 8/2003
GB 577198 5/1946
(Continued)

OTHER PUBLICATIONS

International Search Report dated May 21, 2013 in International (PCT) Application No. PCT/JP2013/056315.
(Continued)

*Primary Examiner* — Phillip A Johnson
(74) *Attorney, Agent, or Firm* — Wenderoth, Lind & Ponack, L.L.P.

(57) ABSTRACT

Provided is a sintered bearing (1) including an inner layer (2) and an outer layer (3) formed by integral molding, the sintered bearing (1) having a bearing surface (A) formed on an inner peripheral surface (2a) of an inner layer (2). The inner layer (2) is made of sintered metal containing Fe and a hardness increasing element (such as Ni or Mo). The outer layer (3) is made of sintered metal containing Fe and no hardness increasing element. A concentration gradient of the hardness increasing element is present at an interface between the inner layer (2) and the outer layer (3).

12 Claims, 4 Drawing Sheets

Related U.S. Application Data continuation of application No. 14/382,038, filed as application No. PCT/JP2013/056315 on Mar. 7, 2013, now Pat. No. 9,249,830.

(51) Int. Cl.

| | |
|---|---|
| *F16C 33/14* | (2006.01) |
| *B22F 5/10* | (2006.01) |
| *B22F 7/06* | (2006.01) |
| *F16C 17/02* | (2006.01) |
| *C22C 33/02* | (2006.01) |
| *B22F 3/16* | (2006.01) |
| *B22F 7/02* | (2006.01) |
| *C22C 38/08* | (2006.01) |
| *C22C 38/12* | (2006.01) |
| *C22C 38/16* | (2006.01) |
| *F16C 33/10* | (2006.01) |
| *B22F 3/03* | (2006.01) |

(52) U.S. Cl.
CPC ............ *B22F 7/06* (2013.01); *C22C 33/0278* (2013.01); *C22C 38/08* (2013.01); *C22C 38/12* (2013.01); *C22C 38/16* (2013.01); *F16C 17/02* (2013.01); *F16C 33/128* (2013.01); *F16C 33/145* (2013.01); *B22F 2003/033* (2013.01); *B22F 2207/01* (2013.01); *B22F 2301/35* (2013.01); *B22F 2998/10* (2013.01); *F16C 33/10* (2013.01); *F16C 2202/06* (2013.01); *F16C 2204/60* (2013.01)

(58) Field of Classification Search
CPC ... B22F 7/06; C22C 33/0278; C22C 33/0285; C22C 38/08; C22C 38/12; C22C 38/16
See application file for complete search history.

(56) References Cited

U.S. PATENT DOCUMENTS

| | | | |
|---|---|---|---|
| 6,139,191 A | 10/2000 | Andler | |
| 6,537,683 B1 | 3/2003 | Staschko | |
| 7,998,238 B2 | 8/2011 | Takayama et al. | |
| 2005/0063856 A1* | 3/2005 | Miyasaka | C22C 33/0207 419/1 |
| 2005/0078894 A1 | 4/2005 | Miyasaka et al. | |
| 2006/0159376 A1 | 7/2006 | Takayama et al. | |
| 2007/0232502 A1 | 10/2007 | Tsutsui | |
| 2011/0070119 A1* | 3/2011 | Belhadjhamida | B22F 7/02 419/38 |
| 2011/0249923 A1 | 10/2011 | Lim | |
| 2012/0020592 A1 | 1/2012 | Schmitt et al. | |
| 2013/0223774 A1* | 8/2013 | Ishii | B22F 5/106 384/279 |
| 2013/0315519 A1* | 11/2013 | Calero Martinez | C25D 5/50 384/397 |

FOREIGN PATENT DOCUMENTS

| | | | |
|---|---|---|---|
| JP | 2001-20003 | | 1/2001 |
| JP | 2001-131611 | | 5/2001 |
| JP | 2002-327749 | | 11/2002 |
| JP | 2002-349575 | | 12/2002 |
| JP | 2003-222133 | | 8/2003 |
| JP | 2006-52757 | | 2/2006 |
| JP | 2006052757 A | * | 2/2006 |
| JP | 2008-57626 | | 3/2008 |
| JP | 2011-69486 | | 4/2011 |
| JP | 2012-41639 | | 3/2012 |
| WO | 2010/112309 | | 10/2010 |

OTHER PUBLICATIONS

International Preliminary Report on Patentability and Written Opinion of the International Searching Authority dated Sep. 9, 2014 in International (PCT) Application No. PCT/JP2013/056315.
Office Action dated Jan. 26, 2016 in corresponding Chinese Application No. 201380012002.6, with English translation.
Extended European Search Report dated Feb. 15, 2016 in corresponding European Patent Application No. 13758232.6.
Office Action dated Sep. 2, 2016 in corresponding Japanese Application No. 2013-045117, with English translation.

* cited by examiner

SINTERED BEARING

TECHNICAL FIELD

The present invention relates to a sintered bearing.

BACKGROUND ART

A bearing to be used at, for example, a joint section of an arm of construction machinery is required to have excellent wear resistance because remarkably large surface pressure is applied to a bearing surface of the bearing. As the bearing of this type, for example, there are known a bearing obtained by cutting casting alloy and a bearing obtained by embedding particles of graphite in a sliding surface in a spotted manner. However, both of the bearings have a problem of high production cost. Accordingly, instead of those bearings, a sintered bearing made of sintered metal excellent in moldability is used. For example, Patent Literature 1 discloses, as a bearing for construction machinery, a sintered bearing that is made of sintered metal obtained by dispersing copper in iron-carbon-based alloy containing martensitic structure.

CITATION LIST

Patent Literature 1: JP 2003-222133 A

SUMMARY OF INVENTION

Technical Problems

In order to increase wear resistance, the sintered bearing described above is required to have a bearing surface increased in hardness. In particular, a shaft and a bearing need to be regularly replaced. In a case where the shaft is more easily replaced than the bearing in terms of a design of the construction machinery, such a design may be employed that hardness of the bearing surface is set to be equal to or higher than hardness of the shaft so that frequency of replacement of the bearing due to wear life may be set to be lower than frequency of replacement of the shaft. In this case, hardness of the bearing surface needs to be particularly increased.

In order to increase the hardness of the bearing surface of the sintered bearing, a hardness increasing element (such as Ni, Mo, Mn, or Cr) may be mixed into a material for sintered metal. However, the above-mentioned hardness increasing element is expensive. Thus, when the entire sintered bearing is made of sintered metal containing the hardness increasing element, cost is increased. Further, an outer peripheral surface of the bearing serves as a mounting surface that is mounted to another member, and hence the outer peripheral surface needs to be finished into predetermined dimensions. However, when the entire sintered bearing is made of a material having high hardness, hardness of the outer peripheral surface is also increased, and hence processability of the outer peripheral surface is deteriorated. As a result, there is a fear in that the outer peripheral surface cannot be finished with desired dimension accuracy.

The above-mentioned circumstance is not limited to a case where the bearing surface is formed on an inner peripheral surface of the bearing. The same is true for a case where the bearing surface is formed on the outer peripheral surface. Note that, the "bearing surface" refers to a surface that slides so as to bear relative rotation between two members. The bearing surface may be formed on any one of the shaft side and the bearing side.

The present invention has an object to provide a sintered bearing having a bearing surface increased in hardness, which can be manufactured at low cost with high dimension accuracy.

Solution to Problems

According to one embodiment of the present invention, which is devised to achieve the above-mentioned object, there is provided a sintered bearing, comprising: an inner layer; and an outer layer formed on a radially outer side of the inner layer, the inner layer and the outer layer being formed by integral molding, the sintered bearing having a bearing surface formed on any one of an inner peripheral surface of the inner layer and an outer peripheral surface of the outer layer, wherein one of the inner layer and the outer layer, which has the bearing surface, is made of sintered metal containing Fe and a hardness increasing element, and another of the inner layer and the outer layer, which has no bearing surface, is made of sintered metal containing Fe and no hardness increasing element, and wherein a concentration gradient of the hardness increasing element is present at an interface between the inner layer and the outer layer.

Note that, the hardness increasing element refers to an element that contributes to increase in surface hardness. For example, as the hardness increasing element, at least one kind selected from among Ni, Mo, Mn, and Cr may be used. Specifically, for example, in a case where the bearing surface is formed on the inner peripheral surface of the inner layer, the inner layer may be made of sintered metal containing Fe, Cu, C, Ni, Mo, and inevitable impurities as the balance, and the outer layer may be made of sintered metal containing Fe, Cu, C, and inevitable impurities as the balance.

As described above, the layer having the bearing surface is made of sintered metal containing the hardness increasing element, and thus it is possible to obtain the bearing surface increased in hardness. Further, the layer having no bearing surface is made of sintered metal containing no hardness increasing element, and thus an amount of usage of the hardness increasing element is reduced. Accordingly, it is possible to reduce material cost. Further, the hardness increasing element is not mixed into one of the layers (layer having no bearing surface), and thus the one of the layers becomes softer than another one of the layers (layer having the bearing surface) so as to be increased in processability. Accordingly, it is possible to increase dimension accuracy of an outer peripheral surface of the sintered bearing.

Further, in the above-mentioned sintered bearing, the concentration gradient of the hardness increasing element is present at the interface (boundary) between the inner layer and the outer layer. That is, in a vicinity of the interface between the inner layer and the outer layer, there is formed a region containing the hardness increasing element and having high hardness. With this, the inner layer and the outer layer are firmly bound together, and thus strength of the sintered bearing is increased.

When Cu is mixed into at least one of the inner layer and the outer layer, Cu functions as a binder to be able to firmly bind the inner layer and the outer layer together. At this time, Cu contained in the layer having the bearing surface contributes to increase in sliding property of the bearing surface, and hence a certain mixing amount of Cu is needed. However, it suffices that Cu in the layer having no bearing surface function as a binder. Therefore, a mixing ratio of Cu in the layer having no bearing surface may be lower than a mixing ratio of Cu in the layer having the bearing surface. As a result, an amount of usage of Cu is reduced, and material cost can be further reduced.

The above-mentioned sintered bearing can be suitably used at a joint section of an arm of construction machinery.

Advantageous Effects of Invention

As described above, according to one embodiment of the present invention, it is possible to obtain the sintered bearing having a bearing surface increased in hardness, which can be manufactured at low cost with high dimension accuracy.

DESCRIPTION OF EMBODIMENTS

Now, embodiments of the present invention are described with reference to the drawings.

Figure 1:
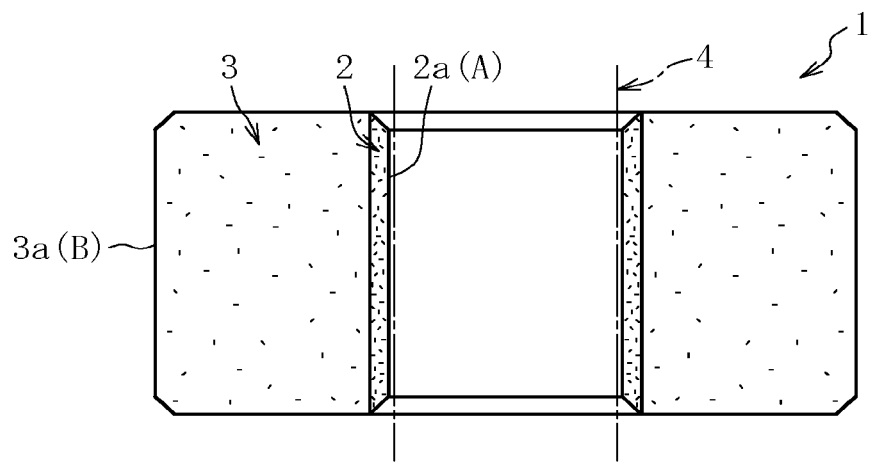
FIG. 1 is a cross-sectional view of a sintered bearing according to an embodiment of the present invention.
Figure 2:
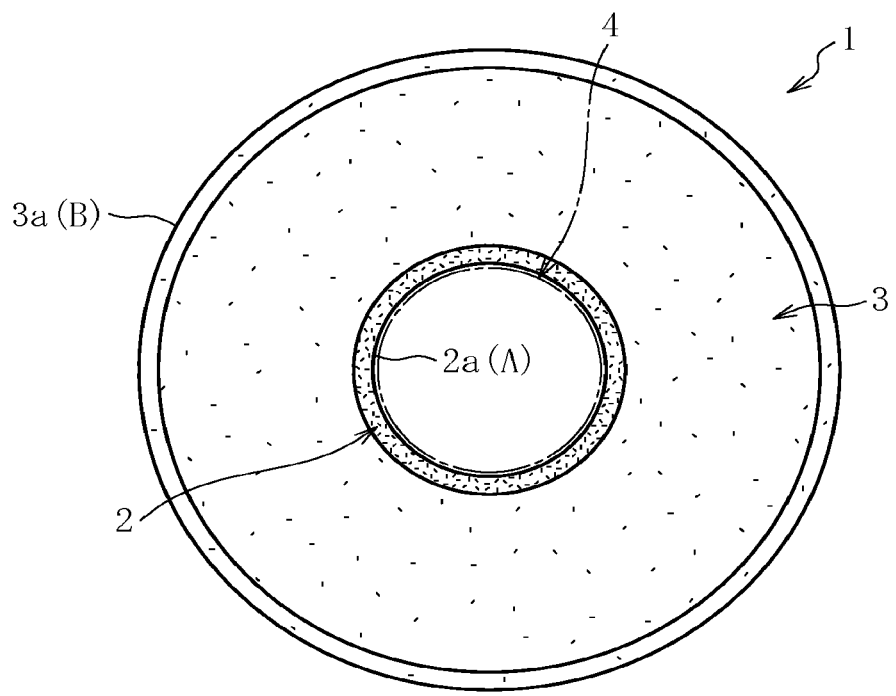
FIG. 2 is a plan view of the sintered bearing.

As illustrated in FIG. 1 and FIG. 2, a sintered bearing 1 according to an embodiment of the present invention is made of cylindrical sintered metal, and is used at, for example, a joint section of an arm of construction machinery. The sintered bearing 1 integrally comprises an inner layer 2 and an outer layer 3. In the illustrated example, the sintered bearing 1 is formed only of the inner layer 2 and the outer layer 3, and both layers have a tubular shape, in particular, a cylindrical shape. An inner peripheral surface of the sintered bearing 1 is formed into a smooth cylindrical surface, and the sintered bearing 1 has a bearing surface A for slidingly supporting a shaft 4 in a relatively rotatable manner. The shaft 4 is inserted along an inner periphery of the sintered bearing 1. An outer peripheral surface of the sintered bearing 1 is formed into a smooth cylindrical surface, and the sintered bearing 1 has a mounting surface B that is mounted to another member. Each axial end surface of the sintered bearing 1 is also formed into a flat surface. The sintered bearing 1 has, for example, an inner diameter of 30 to 100 mm and a radial thickness of 5 to 50 mm. In this embodiment, the sintered bearing 1 has an inner diameter of 35 mm and an outer diameter of 45 mm. A lubricant (such as oil and liquid grease) is impregnated into inner pores of the sintered bearing 1, and the sintered bearing 1 is held in slide-contact with the shaft 4. Thus, the lubricant seeps out from surface pores formed in the bearing surface A of the sintered bearing 1 so that the lubricant may be supplied to a sliding portion between the bearing surface A and the shaft 4.

The inner layer 2 is made of sintered metal containing Fe and a hardness increasing element. At least one kind selected from among, for example, Ni, Mo, Mn, and Cr may be used as the hardness increasing element. The inner layer 2 according to this embodiment is made of sintered metal containing Fe, Cu, C, the hardness increasing elements (for example, Ni and Mo), and inevitable impurities as the balance. Specifically, for example, the inner layer 2 is made of sintered metal containing 15 to 20 wt % of Cu, 0.3 to 0.8 wt % of C, 1.5 to 3.5 wt % of Ni, 0.5 to 1.5 wt % of Mo, and Fe and inevitable impurities as the balance. The bearing surface A is formed on an inner peripheral surface 2a of the inner layer 2. In the illustrated example, the entire inner peripheral surface 2a of the inner layer 2 functions as the bearing surface A. A radial thickness of the inner layer 2 is set to approximately 5 to 20% of a radial thickness of the sintered bearing 1 (for example, set to 0.3 to 2 mm). In this embodiment, the radial thickness of the inner layer 2 is set to approximately 1 mm. The reason is as follows. When the inner layer 2 is extremely thin, a filling property of a raw-material powder at the time of molding is deteriorated and an allowable wear limit is reduced. When the inner layer 2 is extremely thick, an amount of usage of the hardness increasing element is increased, which leads to increase in cost.

As described above, the sintered metal of the inner layer 2 contains the hardness increasing element, and thus it is possible to obtain the bearing surface A that is increased in hardness and excellent in wear resistance. Further, the inner layer 2 contains Fe as a main component and also contains C, and hence tensile strength and hardness can be increased. Further, the inner layer 2 contains Cu, and hence the bearing surface A is increased in sliding property, to thereby be able to reduce friction with the shaft 4. Further, as described above, when a quenching-property enhancing element such as Ni or Mo is selected as the hardness increasing element, it is possible to attain an effect of lowering a starting temperature of martensitic transformation. Accordingly, it is possible to achieve increase in hardness resulting from martensitic transformation in a cooling zone of a continuous sintering furnace in a sintering step described below.

The outer layer 3 is made of sintered metal containing Fe and no hardness increasing element (for example, none of Ni, Mo, Mn, and Cr). The outer layer 3 according to this embodiment is made of sintered metal containing Fe, Cu, C, and inevitable impurities as the balance. Specifically, for example, the outer layer 3 is made of sintered metal containing 2 to 5 wt % of Cu, 0.2 to 0.8 wt % of C, and Fe and inevitable impurities as the balance. The mounting surface B that is mounted to another member is formed on an outer peripheral surface 3a of the outer layer 3. In the illustrated example, the entire outer peripheral surface 3a of the outer layer 3 functions as the mounting surface B.

As described above, the sintered metal of the outer layer 3 contains no hardness increasing element, and hence an amount of usage of the expensive hardness increasing element is reduced. Thus, material cost can be reduced. Further, the sintered metal of the outer layer 3 contains no hardness increasing element, and hence hardness of the outer layer 3 can be lower than hardness of the inner layer 2. Accordingly, processability of the outer layer 3 is enhanced, and thus dimension accuracy of the mounting surface B can be increased.

Further, at least one (both in this embodiment) of the inner layer 2 and the outer layer 3 contains Cu, and thus Cu functions as a binder through melting and binding. In this manner, a force of binding the inner layer 2 and the outer layer 3 together is increased. In order to obtain this function, it is preferred that the outer layer 3 contain 2 wt % or more of Cu. Further, in order to reduce an amount of usage of Cu to achieve reduction in cost, it is preferred that a mixing ratio of Cu in the outer layer 3 be lower than a mixing ratio of Cu in the inner layer 2. Specifically, it is preferred that the mixing ratio of Cu in the outer layer 3 be set to 5 wt % or less.

Figure 3:
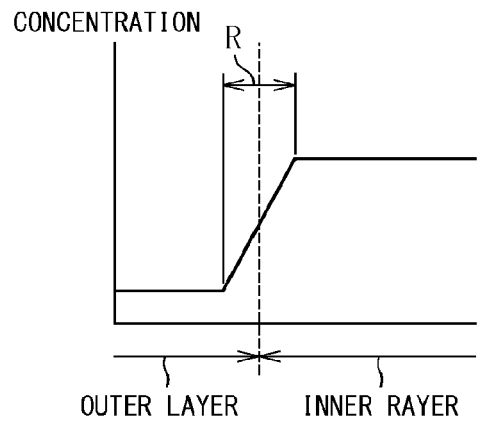
FIG. 3 is a graph showing a concentration gradient of a hardness increasing element.

A concentration gradient of the hardness increasing element is present at an interface between the inner layer 2 and the outer layer 3. The concentration gradient is present over an entire axial region of the interface between the inner layer 2 and the outer layer 3. In this embodiment, as conceptually shown in FIG. 3, in a vicinity of the interface (indicated by the dotted line) between the inner layer 2 and the outer layer 3, specifically, in a radial region extending across the interface, concentrations of Ni and Mo are gradually decreased from the inner layer 2 toward the outer layer 3. With this, a region containing the hardness increasing element is formed in the vicinity of the interface, and hence strength of the interface and also binding strength between the inner layer 2 and the outer layer 3 are increased. It is desired that a radial dimension R of a region (hereinafter referred to as a "concentration gradient region"), in which the concentration gradient of the hardness increasing element is present, be set within a range of from 0.1 to 1.0 mm, preferably within a range of from 0.2 to 0.5 mm. The reason is as follows. When the radial dimension R of the concentration gradient region is extremely large, hardness of the outer layer in the vicinity of the interface is increased, and hence there is a problem in that processability is deteriorated and dimension accuracy is adversely affected. When the radial dimension R of the concentration gradient region is extremely small, binding at the interface is weakened, and hence there is a problem in that strength of the bearing is reduced. The radial dimension R of the concentration gradient region can be adjusted depending on, for example, a radial thickness of a partition plate 14 (see FIG. 5) of a two-color molding die assembly described below.

The above-mentioned sintered bearing 1 is manufactured through, for example, a compression-molding step, a sintering step, a reshaping step, a heat treatment step, and an oil-impregnating step. Now, each step is described.

Figure 4:
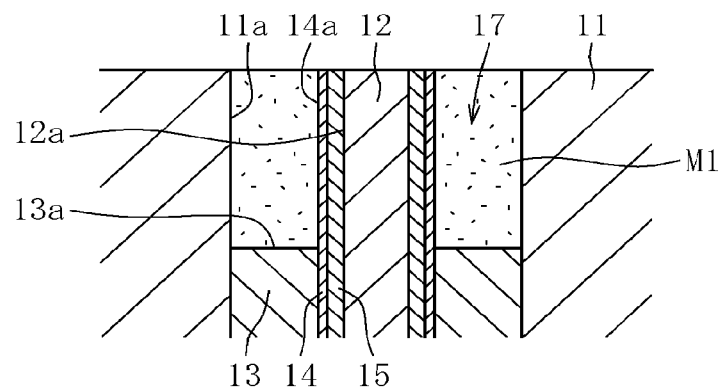
FIG. 4 is a cross-sectional view illustrating a state in which a mixed metal powder for an outer layer is filled in a compression-molding step of manufacturing steps of the sintered bearing.

The compression-molding step is performed using, for example, a die assembly illustrated in FIG. 4. The die assembly comprises: a die 11; a core pin 12 arranged along an inner periphery of the die 11; an outer lower punch 13 arranged between an inner peripheral surface 11a of the die 11 and an outer peripheral surface 12a of the core pin 12; the partition plate 14; an inner lower punch 15; and an upper punch 16 (see FIG. 8). The outer lower punch 13, the partition plate 14, and the inner lower punch 15 have concentric cylindrical shapes, and can be raised and lowered independently of each other.

The compression-molding step is performed by so-called two-color molding in which a material for the inner layer 2 and a material for the outer layer 3 are fed into the same die assembly to integrally mold the inner layer 2 and the outer layer 3. Specifically, first, as illustrated in FIG. 4, the partition plate 14 and the inner lower punch 15 are raised to an upper end position, and the outer lower punch 13 is lowered to a lower end position. Thus, the inner peripheral surface 11a of the die 11, an outer peripheral surface 14a of the partition plate 14, and an end surface 13a of the outer lower punch 13 form an outer cavity 17 having a cylindrical shape. A first mixed metal powder M1 for forming the outer layer 3 is filled into the outer cavity 17. The first mixed metal powder M1 according to this embodiment contains a Fe powder, a Cu powder, and a C powder. Specifically, for example, SMF4030 (JIS Z2550:2000) may be used as the first mixed metal powder M1.

Figure 5:
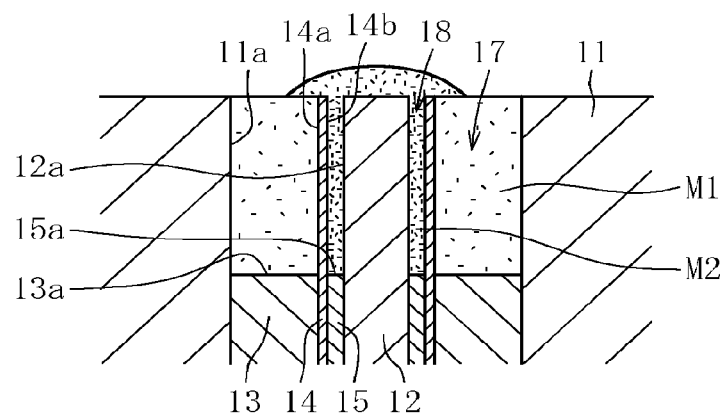
FIG. 5 is a cross-sectional view illustrating a state in which a mixed metal powder for an inner layer is filled in the compression-molding step.

Next, as illustrated in FIG. 5, the inner lower punch 15 is lowered to the lower end position, and thus an inner peripheral surface 14b of the partition plate 14, the outer peripheral surface 12a of the core pin 12, and an end surface 15a of the inner lower punch 15 form an inner cavity 18 having a cylindrical shape. A second mixed metal powder M2 for forming the inner layer 2 is filled into the inner cavity 18. The second mixed metal powder M2 according to this embodiment contains the Fe powder, the Cu powder, the C powder, a Ni powder, and a No powder. At this time, the second mixed metal powder M2 is caused to overflow the inner cavity 18 so as to cover an upper side of the partition plate 14.

Figure 6:
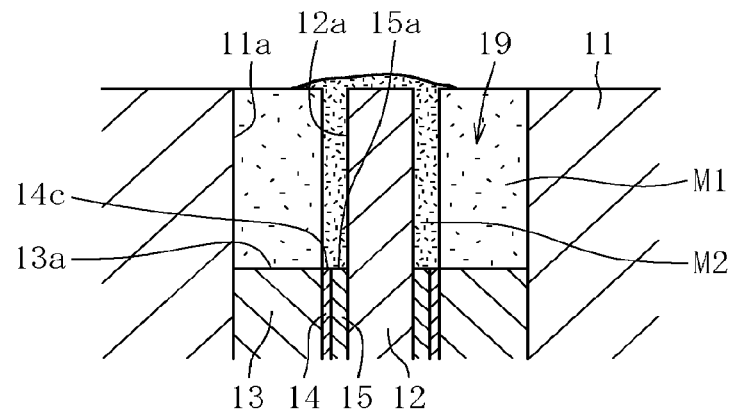
FIG. 6 is a cross-sectional view illustrating a state in which a partition plate is lowered in the compression-molding step.
Figure 7:
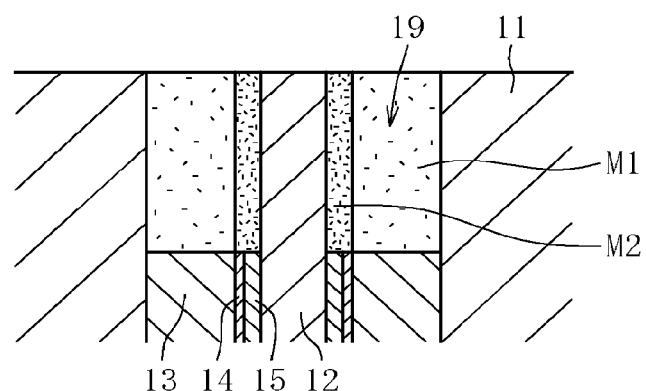
FIG. 7 is a cross-sectional view illustrating a state in which a surplus of the metal powder is removed in the compression-molding step.

Next, as illustrated in FIG. 6, the partition plate 14 is lowered. Thus, the second mixed metal powder M2 enters a space corresponding to the partition plate 14, and the first mixed metal powder M1 and the second mixed metal powder M2 are brought into contact with each other. In this manner, a cavity 19 formed by the inner peripheral surface 11a of the die 11, the end surface 13a of the outer lower punch 13, an end surface 14c of the partition plate 14, the end surface 15a of the inner lower punch 15, and the outer peripheral surface 12a of the core pin 12 is filled with the first mixed metal powder M1 and the second mixed metal powder M2 in a double-layer state. Then, a surplus of the second mixed metal powder M2 overflowing the cavity 19 is removed (see FIG. 7).

Figure 8:
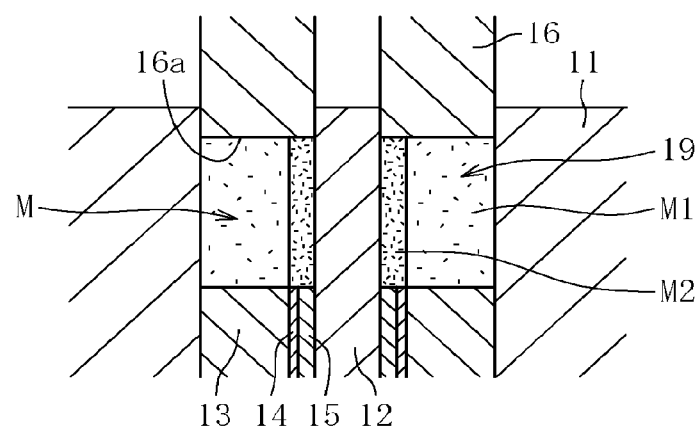
FIG. 8 is a cross-sectional view illustrating a state in which the mixed metal powders are compressed by an upper punch in the compression-molding step.
Figure 9:
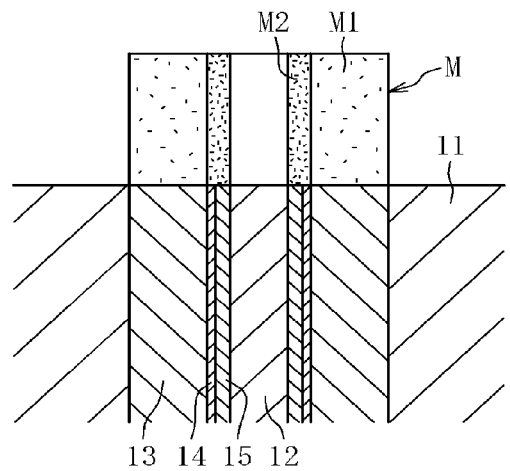
FIG. 9 is a cross-sectional view illustrating a state in which a green compact is taken out of a die assembly in the compression-molding step.

After that, as illustrated in FIG. 8, the upper punch 16 is lowered, and the mixed metal powders M1, M2 filled into the cavity 19 are compressed from above by an end surface 16a of the upper punch 16. Thus, a green compact M is molded. As illustrated in FIG. 9, the outer lower punch 13, the partition plate 14, and the inner lower punch 15 are raised, and the green compact M is taken out of the die assembly.

Figure 10:
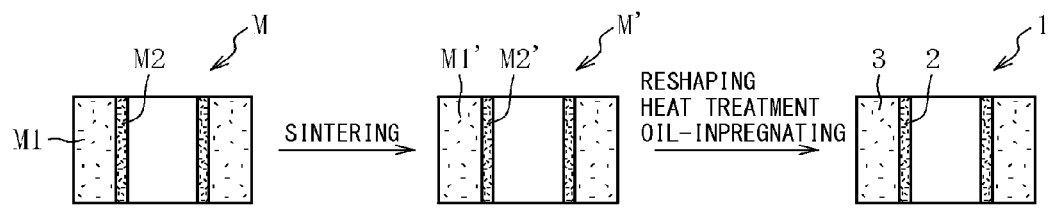
FIG. 10 is a view illustrating the manufacturing steps performed after the compression-molding step.

After that, in the sintering step, the green compact M is sintered at a predetermined sintering temperature (for example, 1,120° C.), and thus a sintered compact M' is obtained (see FIG. 10). In this embodiment, the sintering step is performed in the continuous sintering furnace. At this time, the sintered compact M' contains the quenching-property enhancing elements (Ni and Mo), and hence a starting temperature of martensitic transformation of the sintered compact M' is lowered. Accordingly, it is possible to achieve increase in hardness resulting from martensitic transformation of the sintered compact M' in the cooling zone of the continuous sintering furnace.

The sintered compact M' obtained through the sintering step is reshaped into predetermined dimensions in the subsequent reshaping step. In this embodiment, an inner peripheral surface, an outer peripheral surface, and both end surfaces of the sintered compact M' are pressed by a sizing die assembly, and thus the sintered compact M' is die-molded into predetermined dimensions (not shown). At this time, an outer layer M1' of the sintered compact M' is made of relatively soft sintered metal containing no hardness increasing element, and has satisfactory processability. Accordingly, the outer layer M1', in particular, the outer peripheral surface of the sintered compact M' can be molded with high accuracy.

Heat treatment is performed on the sintered compact M' thus reshaped with predetermined dimension accuracy (heat treatment step). Specifically, for example, tempering for eliminating internal stress of the sintered compact M' is performed. Then, the lubricant is impregnated into the inner pores of the sintered compact M' that has undergone heat treatment, and thus the sintered bearing 1 is completed.

The present invention is not limited to the above-mentioned embodiment. For example, in the above-mentioned embodiment, the reshaping step is performed by die molding using the sizing die assembly, but the present invention is not limited thereto. The reshaping step may be performed by another method such as machining. Further, in a case where desired dimension accuracy can be obtained without reshaping, the reshaping step may be omitted. Further, in the above-mentioned embodiment, tempering is performed as the heat treatment step. However, quenching (for example, carburizing and quenching) may be performed before tempering, and thus hardness of a surface of the sintered compact M' may be increased. Note that, when the inner layer 2 containing the hardness increasing element has adequate hardness, it is preferred that quenching be omitted to achieve reduction in cost.

Figure 11:
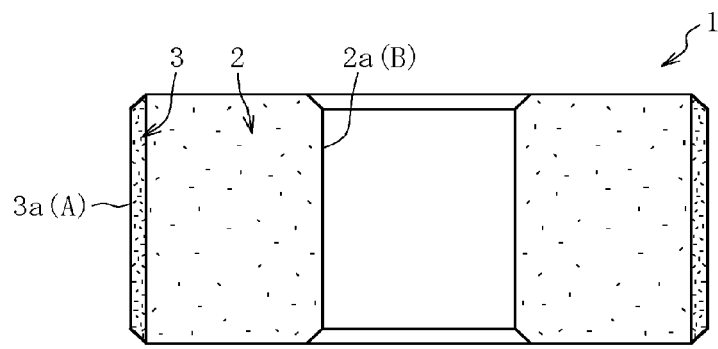
FIG. 11 is a cross-sectional view of a sintered bearing according to another embodiment of the present invention.

Further, the above-mentioned embodiment exemplifies a case where the bearing surface A is formed on the inner peripheral surface 2a of the inner layer 2, but the present invention is not limited thereto. For example, as illustrated in FIG. 11, the present invention may be applied to the sintered bearing 1 in which the bearing surface A is formed on the outer peripheral surface 3a of the outer layer 3. In this case, the outer layer 3 is made of sintered metal containing Fe and the hardness increasing element, whereas the inner layer 2 is made of sintered metal containing Fe and no hardness increasing element. Specifically, for example, the outer layer 3 is made of sintered metal containing Fe, Cu, C, Ni, Mo, and inevitable impurities as the balance, whereas the inner layer 2 is made of sintered metal containing Fe, Cu, C, and inevitable impurities as the balance. In this case, hardness of the outer layer 3 is higher than hardness of the inner layer 2. The concentration gradient of the hardness increasing element is present at the interface between the inner layer 2 and the outer layer 3, and in the vicinity of the interface, concentration of the hardness increasing element is gradually decreased from the outer layer 3 toward the inner layer 2. The mounting surface B that is mounted to another member (outer peripheral surface of the shaft) is formed on the inner peripheral surface 2a of the inner layer 2. A thickness of the outer layer 3 is set to approximately 5 to 20% of the radial thickness of the sintered bearing 1, that is, set within, for example, a range of from 0.3 to 2 mm.

Further, the above-mentioned embodiment exemplifies a case where the interface between the inner layer 2 and the outer layer 3 assumes a cylindrical surface shape, but the present invention is not limited thereto. A cross-section of the interface orthogonal to an axis can be formed into a non-circular shape (for example, polygonal shape or spline shape) (not shown). Thus, the binding strength between the inner layer 2 and the outer layer 3 is further increased. At this time, the shape of the interface is parallel to an axial direction. The shape of the interface is formed in conformity with a shape of the partition plate 14 (see FIG. 5 and the like) in the compression-molding step, and hence the shape of the interface can be changed through change of the shape of the partition plate 14.

Further, the above-mentioned embodiment exemplifies a case where the sintered bearing 1 is applied to construction machinery, but the present invention is not limited thereto. The present invention can be suitably applied to such an application that high surface pressure is applied to the bearing surface.

REFERENCE SIGNS LIST 1 sintered bearing
2 inner layer
3 outer layer
A bearing surface
B mounting surface

The invention claimed is:

1. A manufacturing method for a sintered bearing, the manufacturing method comprising:
    molding a green compact having a cylindrical shape, the green compact having an inner layer and an outer layer provided on a radially outer side of the inner layer; and
    sintering the green compact to obtain a sintered compact having an inner layer and an outer layer provided on a radially outer side of the inner layer, a bearing surface being provided on an inner peripheral surface of the inner layer of the sintered compact,
    wherein the inner layer of the green compact is made of Fe as a main component, C, and a quenching-property enhancing element, and the outer layer of the green compact is made of Fe and no quenching-property enhancing element.

2. The manufacturing method for the sintered bearing according to claim 1, wherein the quenching-property enhancing element comprises at least one of Ni, Mo, Mn, and Cr.

3. The manufacturing method for the sintered bearing according to claim 1, wherein the inner layer of the green compact is made of Fe, Cu, C, Ni, Mo, and inevitable impurities as the balance, and the outer layer of the green compact is made of Fe, Cu, C, and inevitable impurities as the balance.

4. The manufacturing method for the sintered bearing according to claim 3,
    wherein the inner layer of the green compact is made of 15 to 20 wt % of Cu, 0.3 to 0.8 wt % of C, 1.5 to 3.5 wt % of Ni, 0.5 to 1.5 wt % of Mo, Fe, and the inevitable impurities as the balance, and
    wherein the outer layer of the green compact is made of 2 to 5 wt % of Cu, 0.2 to 0.8 wt % of C, Fe, and the inevitable impurities as the balance.

5. The manufacturing method for the sintered bearing according to claim 1, wherein at least one of the inner layer of the green compact and the outer layer of the green compact contains Cu.

6. The manufacturing method for the sintered bearing according to claim 5, wherein a mixing ratio of Cu in the outer layer of the green compact is lower than a mixing ratio of Cu in the inner layer of the green compact.

7. A manufacturing method for a sintered bearing, the manufacturing method comprising:
    molding a green compact having a cylindrical shape, the green compact having an inner layer and an outer layer provided on a radially outer side of the inner layer; and sintering the green compact to obtain a sintered compact having an inner layer and an outer layer provided on a radially outer side of the inner layer, a bearing surface being provided on an outer peripheral surface of the outer layer of the sintered compact, wherein the outer layer of the green compact is made of Fe as a main component, C, and a quenching-property enhancing element, and the inner layer of the green compact is made of Fe and no quenching-property enhancing element.

8. The manufacturing method for the sintered bearing according to claim 7, wherein the quenching-property enhancing element comprises at least one of Ni, Mo, Mn, and Cr.

9. The manufacturing method for the sintered bearing according to claim 7, wherein the outer layer of the green compact is made of Fe, Cu, C, Ni, Mo, and inevitable impurities as the balance, and the inner layer of the green compact is made of Fe, Cu, C, and inevitable impurities as the balance.

10. The manufacturing method for the sintered bearing according to claim 9, wherein the outer layer of the green compact is made of 15 to 20 wt % of Cu, 0.3 to 0.8 wt % of C, 1.5 to 3.5 wt % of Ni, 0.5 to 1.5 wt % of Mo, Fe, and the inevitable impurities as the balance, and wherein the inner layer of the green compact is made of 2 to 5 wt % of Cu, 0.2 to 0.8 wt % of C, Fe, and the inevitable impurities as the balance.

11. The manufacturing method for the sintered bearing according to claim 7, wherein at least one of the inner layer of the green compact and the outer layer of the green compact contains Cu.

12. The manufacturing method for the sintered bearing according to claim 11, wherein a mixing ratio of Cu in the inner layer of the green compact is lower than a mixing ratio of Cu in the outer layer of the green compact.

* * * * *